(12) United States Patent
Hu et al.

(10) Patent No.: US 9,302,345 B2
(45) Date of Patent: Apr. 5, 2016

(54) LASER MACHINING CALIBRATION METHOD

(75) Inventors: Zhaoli Hu, Dunlap, IL (US); Chunfu Cliff Huang, Peoria, IL (US); Justin Lee Koch, Deer Creek, IL (US)

(73) Assignee: Caterpillar Inc., Peoria, IL (US)

( * ) Notice: Subject to any disclaimer, the term of this patent is extended or adjusted under 35 U.S.C. 154(b) by 2228 days.

(21) Appl. No.: 12/230,432

(22) Filed: Aug. 28, 2008

(65) Prior Publication Data

US 2009/0065488 A1    Mar. 12, 2009

Related U.S. Application Data

(60) Provisional application No. 60/935,804, filed on Aug. 31, 2007.

(51) Int. Cl.
*B23K 26/38* (2014.01)
*B23K 26/04* (2014.01)

(52) U.S. Cl.
CPC .................... *B23K 26/04* (2013.01)

(58) Field of Classification Search
CPC .. B23K 26/08; B23K 10/006; B23K 26/0643; B23K 26/0652; B23K 26/0884; B23K 26/0892; B23K 31/125; B23K 15/0006; B23K 26/00; B23K 26/707; B23K 28/02; B23K 31/12; B23K 7/002; B23K 26/04
USPC ............... 219/121.72, 121.67, 121.83, 121.6, 219/121.7, 121.85
See application file for complete search history.

(56) References Cited

U.S. PATENT DOCUMENTS

| | | | |
|---|---|---|---|
| 4,074,104 A | 2/1978 | Fulkerson | |
| 4,088,890 A | 5/1978 | Waters | |
| 4,327,275 A | 4/1982 | Asaba et al. | |
| 4,651,283 A * | 3/1987 | Sciaky et al. | 700/207 |
| 4,710,604 A | 12/1987 | Shirasu et al. | |
| 4,761,534 A * | 8/1988 | Foulkes | 219/121.8 |
| 4,769,523 A * | 9/1988 | Tanimoto et al. | 219/121.6 |
| 4,914,270 A | 4/1990 | Copley et al. | |
| 4,918,284 A * | 4/1990 | Weisz | 219/121.78 |
| 5,003,153 A | 3/1991 | Kondo | |
| 5,168,141 A * | 12/1992 | Tashjian et al. | 219/121.63 |
| 5,196,672 A | 3/1993 | Matsuyama et al. | |
| 5,304,773 A * | 4/1994 | Kilian et al. | 219/121.78 |
| 5,418,345 A | 5/1995 | Adamski | |
| 5,534,705 A | 7/1996 | Terawaki et al. | |
| 6,239,406 B1 * | 5/2001 | Onoma et al. | 219/121.82 |
| 6,355,907 B1 | 3/2002 | Kuehnle et al. | |
| 6,610,961 B1 * | 8/2003 | Cheng | 219/121.71 |
| 6,951,627 B2 * | 10/2005 | Li et al. | 264/400 |
| 7,005,606 B2 * | 2/2006 | Legge et al. | 219/121.83 |
| 7,323,657 B2 * | 1/2008 | Cheng | 219/121.69 |
| 2004/0245227 A1 * | 12/2004 | Grafton-Reed et al. | 219/121.83 |
| 2008/0316504 A1 * | 12/2008 | Nemets et al. | 356/614 |

FOREIGN PATENT DOCUMENTS

| | | |
|---|---|---|
| JP | 07112288 | 5/1995 |
| JP | 09057484 | 3/1997 |
| JP | 11267871 | 10/1999 |

* cited by examiner

*Primary Examiner* — Eric Stapleton

(74) *Attorney, Agent, or Firm* — Finnegan, Henderson, Farabow, Garrett & Dunner, LLP

(57) ABSTRACT

A calibration method is disclosed. The method includes locating a focal point of a laser relative to at least one reference datum of a workspace, the focal point being where the laser produces machining. The method also includes machining at least one reference mark onto a work piece via the laser machining at the focal point and measuring an offset between a reference point on the work piece and the at least one reference mark.

20 Claims, 6 Drawing Sheets

LASER MACHINING CALIBRATION METHOD

This application claims the benefit of U.S. Provisional Patent Application Ser. No. 60/935,804, filed Aug. 31, 2007.

TECHNICAL FIELD

The present disclosure is directed to a method of calibration and, more particularly, to a method of calibration for laser machining.

BACKGROUND

During machining operations, technicians typically locate a work piece relative to a tool, such as a laser, spindle operated tool, or a nozzle of a water-jet. Technicians may position a work piece relative to a known reference datum so that offsets may be calculated for positioning features such as holes, pockets, or cuts on the work piece. Often the features to be machined within the work piece will be generated in a Computer Aided Design (CAD) system, such as Pro/ENGINEER®, Unigraphics®, or CATIA®. When a CAD system is used, the locations of the features may be calculated within the software relative to the reference datum. To ensure that the features are machined in the proper place within the work piece, it is required to accurately locate the work piece relative to the reference datum. This is often done by the guess-and-check method where a technician may iteratively mark the work piece with a laser and then move one or the other accordingly until the laser strikes a desired portion of the work piece. The calibration may be repeated until the work piece is located in the proper position. Once properly positioned with respect to the reference datum, the CAD system can proceed to control the machining of the work piece. The calibration may be repeated periodically for production runs to ensure consistency and meet tolerances.

Although this iterative guess-and-check calibration method may be sufficient in locating a work piece, the method may not be ideal for production runs or where consistency is needed and efficiency is desired. When the work piece and machining tools are small, such as, for example, in laser machining applications, it may be required to remove a work piece between each iteration. The removal of the work piece may be required to locate the reference marks on the work piece using a microscope or other imaging device that can enlarge an image of the work piece.

An attempt at calibrating a laser welding system is described in U.S. Pat. No. 5,168,141 (the '141 patent) issued to Tashjian et al. The '141 patent discloses a laser welding system including a laser welder, a positioning table, and a camera. The positioning table is associated with a table coordinate system, and the camera is associated with a camera coordinate system for a field of view of the camera. A metal sheet is placed on the positioning table under the laser welder, and the laser welder emits a laser beam to burn a hole in the metal sheet at a position, corresponding to a predetermined focal point of the laser welder, on the table coordinate system. The camera records the position of the focal point according to the camera coordinate system and inputs the data to a computer. The computer instructs the positioning table to iteratively adjust the position of the metal sheet, according to an algorithm, until the focal point has the same coordinate on both the table coordinate system and the camera coordinate system, thereby calibrating the camera to the positioning table.

Although the laser welding method of the '141 patent provides a technique for iteratively calibrating a focal point location between a camera field of view and a positioning table, the method may be inefficient for laser machining applications because numerous guess-and-check iterations may be required for calibration.

The calibration method of the present disclosure solves one or more of the problems set forth above and/or other deficiencies in existing technology.

SUMMARY OF THE DISCLOSURE

In accordance with one aspect, the present disclosure is directed toward a calibration method. The method includes locating a focal point of a laser relative to at least one reference datum of a workspace, the focal point being where the laser produces machining. The method also includes machining at least one reference mark onto a work piece via the laser machining at the focal point and measuring an offset between a reference point on the work piece and the at least one reference mark.

According to another aspect, the present disclosure is directed toward a calibration system. The calibration system includes a detection device for detecting a focal point, the focal point being where machining is produced, and a monitor for locating the focal point relative to at least one reference datum of a workspace. The calibration system also includes a laser configured to machine at least one reference mark onto a work piece at the focal point, the work piece having a reference point for measuring an offset to the at least one reference mark.

DETAILED DESCRIPTION

Figure 1:
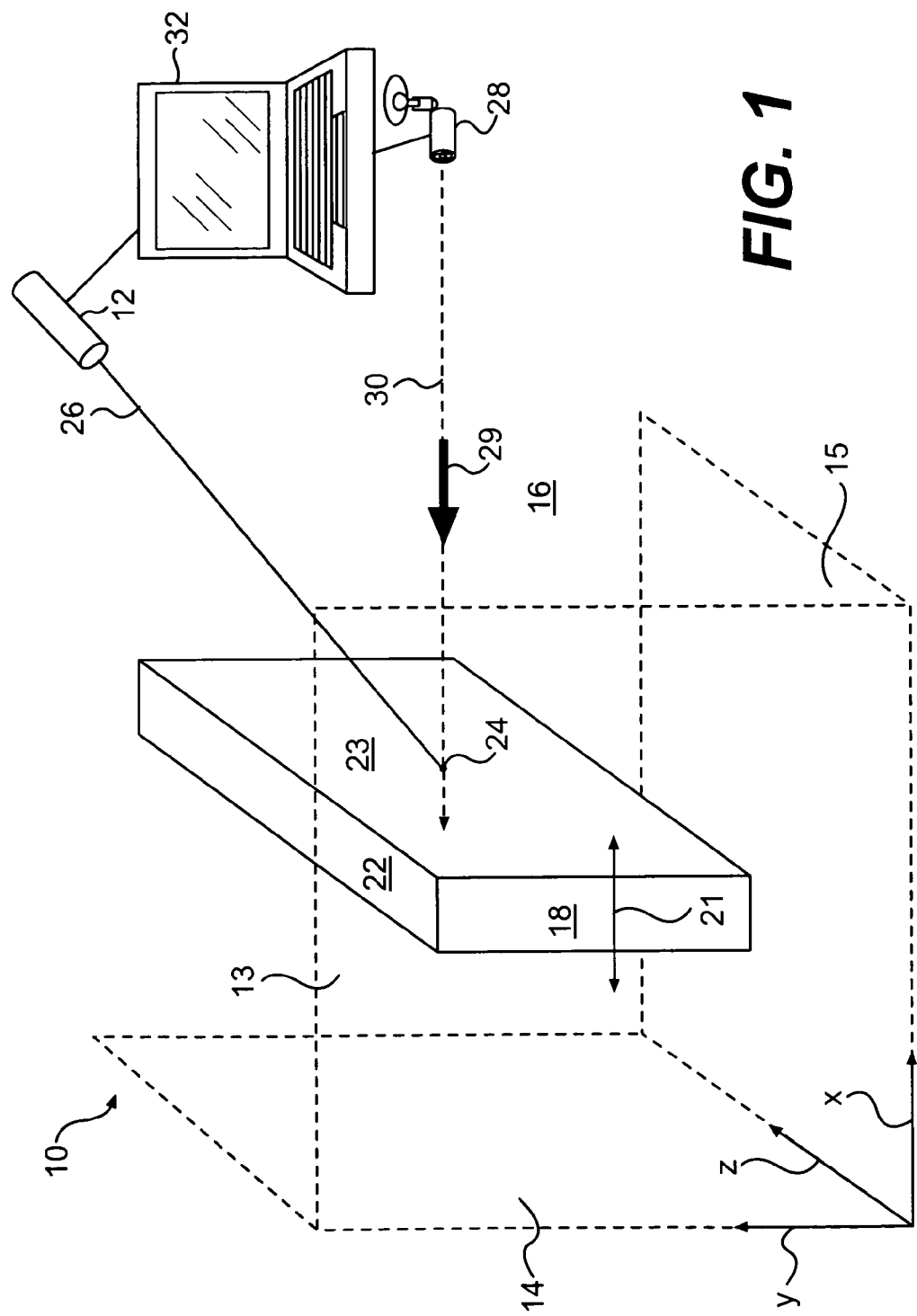
FIG. 1 is a pictorial illustration of an exemplary disclosed laser calibration system.
Figure 2:
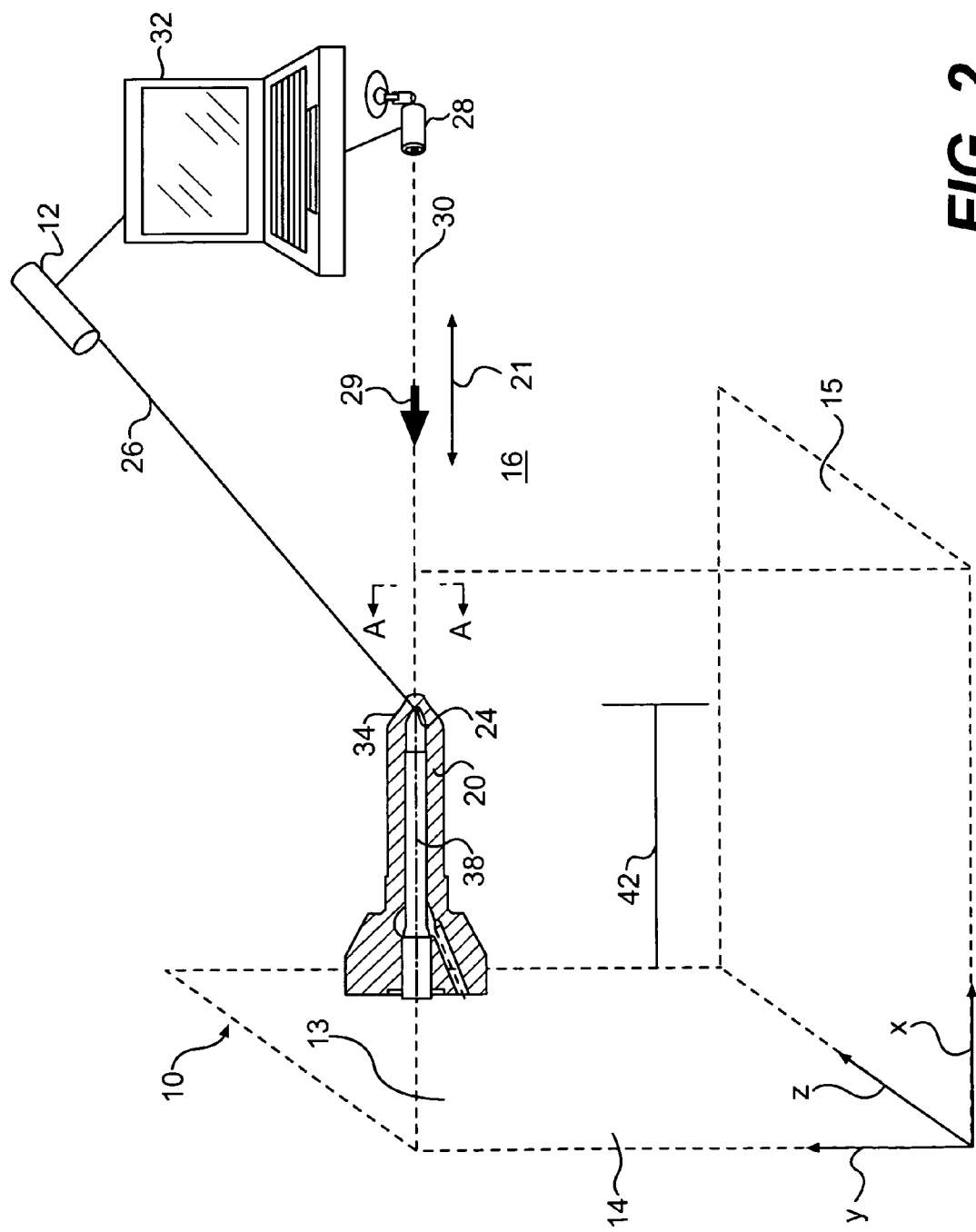
FIG. 2 is another pictorial illustration of the exemplary disclosed laser calibration system.

FIG. 1 illustrates an exemplary laser calibration system 10. Laser calibration system 10 may include a laser 12, a reference datum 13, a reference datum 14, a reference datum 15, a workspace 16, and an object 18. Laser 12 may be any type of laser configured to machine a feature such as a hole or a cut within a work piece 20 (FIG. 2). For example, laser 12 may be an infrared chemical laser such as a chemical oxygen iodine laser. Work piece 20 may be any object requiring laser machining such as, for example, a fuel injector nozzle.

As shown in FIGS. 1 and 2, reference datums 13, 14, 15 may be planes configured to be a fixed reference or a gauge in which dimensions may be generated to position work piece 20 and features within work piece 20. In one example, reference datum 13 may be a generally vertical plane including an x-axis and a y-axis, reference datum 14 may be a generally vertical plane including the y-axis and a z-axis, and reference datum 15 may be a generally horizontal plane including the x-axis and the z-axis. Reference datums 13, 14, 15 may be located anywhere in workspace 16 and may be, in one example, a known "zero" or "home" position of a computer numerically controlled (CNC) laser 12. It is contemplated that additional or fewer reference datums 13, 14, 15 may be used for referencing work piece 20.

Workspace 16 may be a three-dimensional space wherein work piece 20 may be machined. That is, workspace 16 may be comprised of the area in which movement of laser 12 and/or work piece 20 is contained during machining. Object 18 may be a plate having substantially planar surfaces 22 and 23 that can be placed and moved within workspace 16. For example, object 18 may be movably located in workspace 16 such that surface 23 may be substantially parallel to reference datum 14. That is, object 18 may be moveable in workspace 16 to facilitate identifying a focal point 24 of laser 12. Focal point 24 may be the point at which a beam 26 generated by laser 12 may produce machining. Focal point 24 may result from one or more lenses (not shown) configured to focus beam 26 and disposed between laser 12 and object 18 or work piece 20. Specifically, focal point 24 of laser 12 may be extremely small and affect only the material within focal point 24, thereby producing the best machining.

Laser calibration system 10 may include a detection device 28 configured to view workspace 16 along a predetermined viewing direction 29 that may view focal point 24. Detection device 28 may detect focal point 24. Detection device 28 may be a camera configured to detect heat or light from focal point 24 as laser 12 machines object 18 or work piece 20. Detection device 28 may be in communication with an automated processor such as, for example, a computer. The computer may pass a signal to a monitor 32, which monitor 32 may convert to an image of workspace 16. Monitor 32 may be configured to show a 2-dimensional image indicative of observed focal point 24, thereby allowing focal point 24 to be marked on the monitor. Monitor 32 may be any type of monitor known in the art to produce an image. In one example, monitor 32 may be a monitor that is associated with a CNC laser 12.

As shown in FIG. 2, work piece 20 may be located within workspace 16 during machining. It is contemplated that work piece 20 may be oriented in any fashion desired such as, for example, parallel to reference datum 14.

Industrial Applicability

The laser calibration system of the present disclosure may be applicable when performing any laser machining. In particular, the disclosed system may be used to efficiently and accurately position a work piece to be machined by a laser. The operation of laser calibration system 10 will now be explained.

Figure 3:
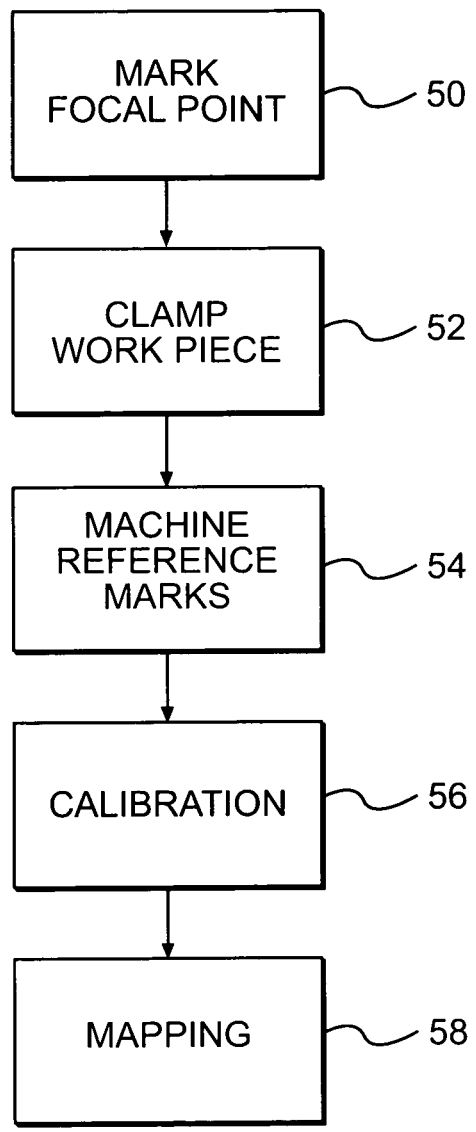
FIG. 3 is a flow chart of an exemplary disclosed laser calibration method.

Laser calibration system 10 may be used to position work piece 20 in workspace 16 to be machined by laser 12, according to the method steps illustrated in FIG. 3. In step 50, focal point 24 may be marked on monitor 32. Focal point 24 of laser 12 may be located relative to reference datums 13, 14, 15 of workspace 16. For example, a technician may place object 18 into workspace 16 parallel to reference datum 14. Object 18 may be moved along the x-axis, in a direction of movement 21. As object 18 comes into contact with focal point 24 of laser 12, detection device 28 may detect the light or heat generated as laser 12 begins to machine object 18, and display a corresponding image on monitor 32, which may view the machining in viewing direction 29. The technician may mark monitor 32 at the location of observed focal point 24 on monitor 32, thereby defining a detection axis 30 (i.e., an axis in the direction of viewing direction 29). Detection axis 30, though a line extending from detection device 28 through focal point 24, may appear as a point on monitor 32. By marking monitor 32 where focal point 24 is observed, the technician may align focal point 24 along detection axis 30, which may simplify calibration as described below. It is contemplated that any manner of marking focal point 24 on monitor 32 may be used. For example, the marking may be physically marking with a marker or using a computer program that can identify focal point 24 and place a digital mark on a screen of monitor 32.

The location of focal point 24 may be related to reference datums 13, 14, 15 by a plurality of datum offsets such as, for example, datum offset 42 between focal point 24 and reference datum 14, as shown in FIG. 2. Focal point 24 may be a location that is predetermined within workspace 16 as a function of properties of laser 12 such as, for example, focal length and lens properties. As laser 12 moves, a location of focal point 24 may be updated relative to reference datums 13, 14, 15 via computer numerical control of laser 12.

In step 52, work piece 20 may be clamped into place within workspace 16. With detection axis 30 defined, the technician may then remove object 18 from workspace 16 and replace it with work piece 20. In one example, a fixture configured to clamp or secure work piece 20 in place may be used. Specifically, as shown in FIG. 2, the technician may place edge 34 of work piece 20 along detection axis 30 by aligning edge 34 with the mark on monitor 32. Monitor 32 may thereby effectively locate work piece 20 along detection axis 30, which includes focal point 24. While viewing work piece 20 via monitor 32, the technician may align centerline 38 (shown as a point in FIG. 4) with the location of focal point 24 marked on monitor 32. The technician may thereby effectively calibrate work piece 20 in two dimensions.

Figure 4:
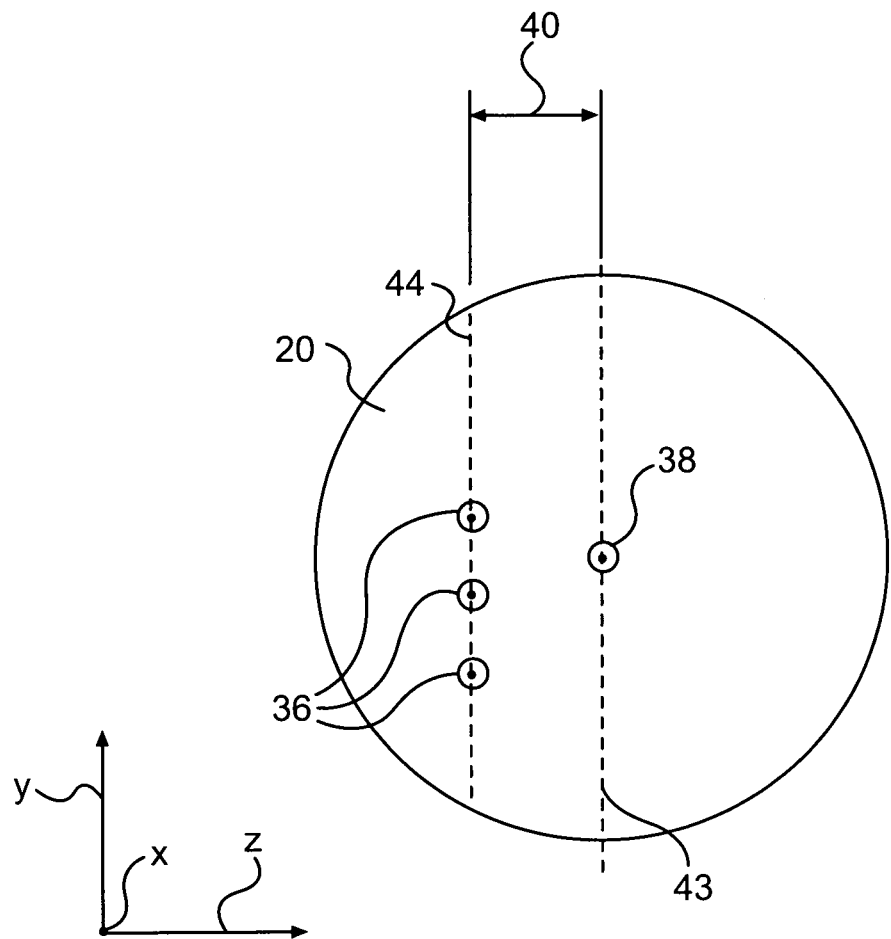
FIG. 4 is a view of an exemplary work piece of the laser calibration system, taken along line A-A of FIG. 2.

In step 54, reference marks may be machined onto work piece 20. At least one reference mark 36 may be machined onto work piece 20 at focal point 24 via laser 12, as shown in FIG. 4. Work piece 20 may be adjusted in a direction along detection axis 30 (e.g., in a direction of movement 21) until machining is detected via detection device 28 and displayed on monitor 32, thereby verifying that focal point 24 is at a surface of work piece 20. Laser 12 may be moved in a straight line to machine two or more reference marks 36 in the surface of work piece 20, thereby creating reference line 44. For example, laser 12 may be moved in a direction along the y-axis. Offset distance 40 may be measured perpendicularly from a plane 43 to reference line 44. Plane 43 may be a plane including a centerline 38 of work piece 20, and may be parallel to both the x-axis and y-axis (i.e., parallel to an x-y plane). A technician may remove work piece 20 from the fixture to measure offset distance 40 using a microscope or other imaging equipment. A technician may then replace work piece 20.

Figure 5:
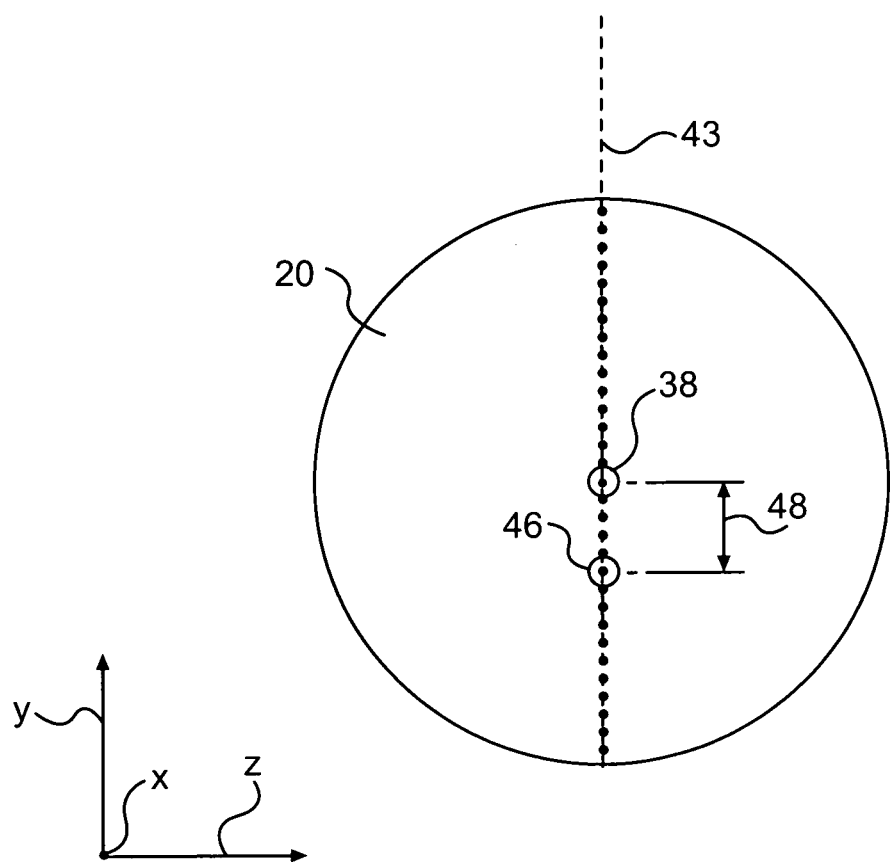
FIG. 5 is another view of the exemplary work piece of the laser calibration system, taken along line A-A of FIG. 2.

In step 56, work piece 20 may be calibrated in a third dimension along detection axis 30. With work piece 20 replaced, the location of work piece 20 or laser 12 may be adjusted according to offset distance 40 so that reference line 44 is located on plane 43, as illustrated in FIG. 5. After adjustment, focal point 24 may also be located on plane 43, thereby calibrating work piece 20 in three dimensions. Offset distance 40 may be, for example, along the z-axis. Alternatively, laser 12 and/or work piece 20 may not be adjusted. Offset distance 40 may be inputted into a computer model such as, for example, a CNC program. Offset distance 40 and datum offset 42 may be programmed into a CNC program allowing the program to adjust its calculations accordingly.

Figure 6:
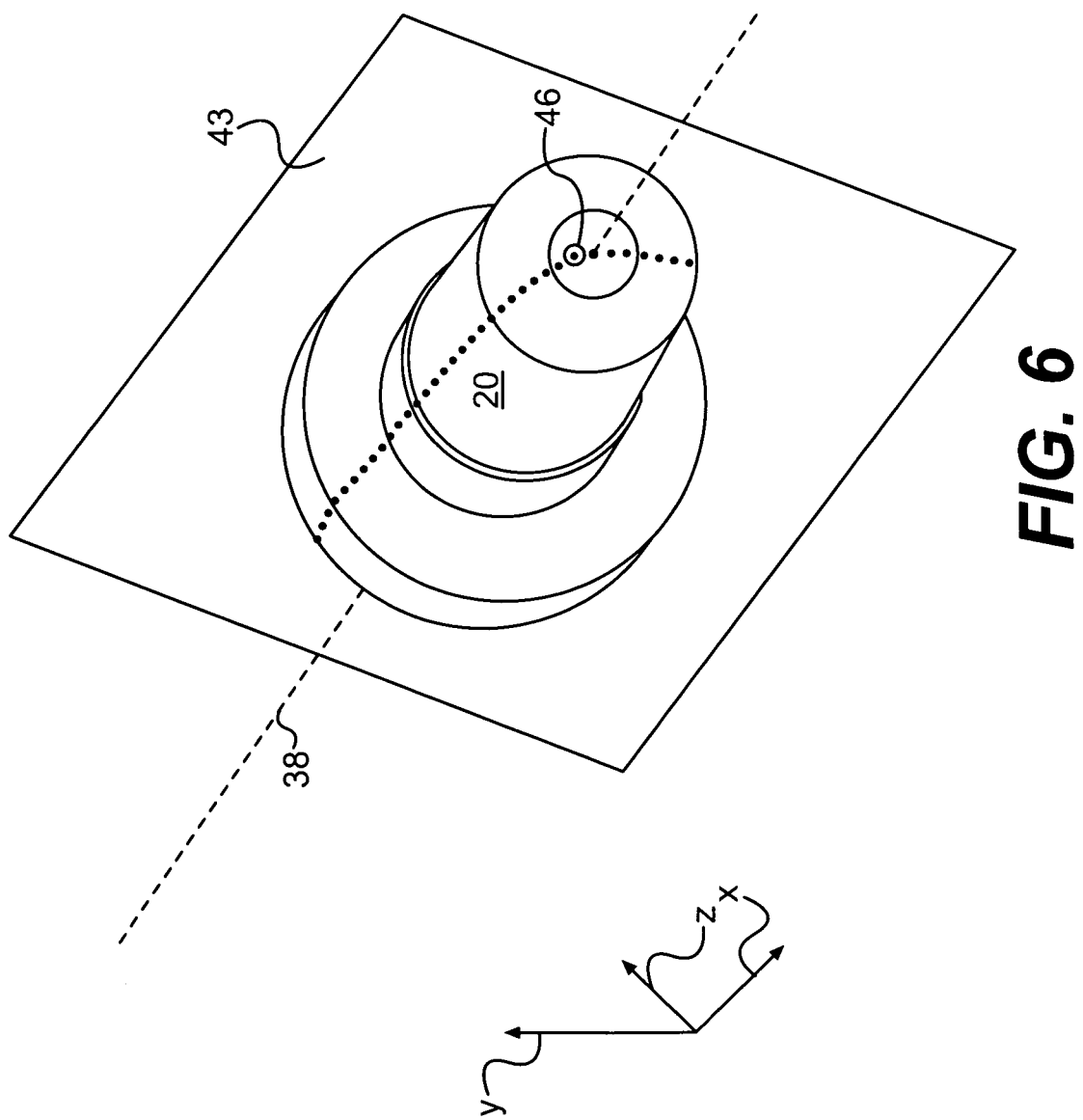
FIG. 6 is a pictorial illustration of the work piece of the laser calibration system of FIG. 2.

In step 58, work piece 20 may be mapped along plane 43, as illustrated in FIGS. 5 and 6, when a shape of work piece 20 is initially unknown. Mapping may be performed to identify a shape of work piece 20 and to input that shape into a CAD program. Laser 12 and/or work piece 20 may be adjusted along plane 43 to machine a plurality of reference marks 46 onto work piece 20 along plane 43. Because work piece 20 has been calibrated, focal point 24 may remain on plane 43 during mapping. Therefore, the surface of work piece 20 intersecting plane 43 may be entirely mapped, via machining at focal point 24, by only moving laser 12 and/or work piece 20 parallel to plane 43 (i.e., in two dimensions instead of three dimensions). Mapping of work piece 20 may therefore be significantly simplified. Additionally, viewing work piece 20 via monitor 32 may also simplify the mapping process, because focal points 24 corresponding to a machining of each reference mark 46 may be located on plane 43 and therefore appear as a straight line on monitor 32. This may ease marking the mapped surface and measuring a plurality of distances 48 between reference marks 46 and centerline 38 to aid in mapping the surface of work piece 20.

Laser calibration system 10 may make the setup of a laser machining process more efficient. In particular, using monitor 32 to identify detection axis 30 may simplify calibration by allowing calibration in two dimensions. By marking focal point 24 on monitor 32, a single adjustment may calibrate work piece 20 in three dimensions. This may reduce the amount of reference marks 36 needed to locate work piece 20 and may save time and the unnecessary marking of work piece 20. Additionally, laser calibration system 10 may make mapping of a surface of work piece 20 simpler and more efficient.

It will be apparent to those skilled in the art that various modifications and variations can be made to the laser calibration system of the present disclosure without departing from the scope of the disclosure. Other embodiments will be apparent to those skilled in the art from consideration of the specification and practice of the laser calibration system disclosed herein. It is intended that the specification and examples be considered as exemplary only, with a true scope of the disclosure being indicated by the following claims and their equivalents.

What is claimed is:

1. A calibration method, comprising:
    locating a focal point of a laser relative to at least one reference datum of a workspace, the focal point being where the laser produces machining, wherein locating the focal point further includes:
    showing an image indicative of the focal point on a monitor, and
    marking the focal point on the monitor in order to define a detection axis;
    aligning the detection axis with a reference axis of a work piece;
    machining at least one reference mark onto the work piece via the laser machining at the focal point; and
    measuring an offset between the reference axis of the work piece and the at least one reference mark.

2. The method of claim 1, wherein locating the focal point further includes detecting heat or light from the machining.

3. The method of claim 2, wherein marking the focal point includes marking the focal point on the monitor with a marker or a computer program.

4. The method of claim 1, wherein machining at least one reference mark includes moving the laser to machine a plurality of reference marks in a straight reference line that is parallel to a plane including a centerline of the work piece.

5. The method of claim 4, wherein the offset is a distance that is perpendicular between the reference line and the plane including the centerline.

6. The method of claim 1, further including adjusting the laser according to the offset.

7. The method of claim 1, further including adjusting the work piece according to the offset.

8. The method of claim 1, further including inputting the offset into a computer model.

9. The method of claim 8, wherein the computer model is a computer numerical control program.

10. The method of claim 1, wherein locating the focal point further includes moving an object through the workspace, in a direction parallel to the at least one reference datum, until the laser machines the object at the focal point.

11. The method of claim 1, wherein the focal point is located at a predetermined distance from the at least one reference datum.

12. The method of claim 1, wherein the reference axis is a centerline of the work piece.

13. The method of claim 1, wherein measuring the offset includes removing the work piece from a fixture and measuring the offset via a microscope.

14. A calibration system, comprising:
    a detection device for detecting a focal point, the focal point being where machining is produced;
    a computer in communication with a monitor, the computer and monitor configured for locating the focal point relative to at least one reference datum of a workspace, wherein the monitor and computer are configured to:
    display an image corresponding to a focal point detected by the detection device;
    allow a technician to mark the detected focal point on the monitor; and
    a laser configured to machine at least one reference mark onto a work piece at the focal point, the work piece having a reference axis for measuring an offset to the at least one reference mark.

15. The calibration system of claim 14, further including a computer numerical control program that receives the offset as input and is associated with the monitor.

16. The calibration system of claim 14, wherein the laser is a computer numerically controlled laser.

17. The calibration system of claim 14, wherein the detection device is a camera that detects heat or light.

18. The calibration system of claim 14, wherein the work piece is clamped into place via a fixture.

19. A method of machining a work piece, comprising:
    locating a focal point of a laser relative to at least one reference datum of a workspace, the focal point being where the laser produces machining, wherein locating the focal point further includes:
    showing an image indicative of the focal point on a monitor, and
    marking the focal point on the monitor in order to define a detection axis;
    aligning the detection axis with a reference axis of a work piece;
    machining at least one reference mark onto the work piece via the laser machining at the focal point;
    measuring an offset between a plane including the reference axis of the work piece and the at least one reference mark; and
    inputting the offset into a model.

20. The method of claim 19, further including machining a line of reference marks onto a surface of the work piece by moving at least one of the laser or the work piece parallel to the plane.

* * * * *